(12) United States Patent
Fong-Jones et al.

(10) Patent No.: US 8,990,793 B1
(45) Date of Patent: Mar. 24, 2015

(54) UPDATING AN OPERATING SYSTEM (71) Applicant: Google Inc., Mountain View, CA (US)

(72) Inventors: Elizabeth Sandra Fong-Jones, Somerville, MA (US); William Alexander Drewry, Nashville, TN (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/098,451

(22) Filed: Dec. 5, 2013

(51) Int. Cl.
*G06F 9/44* (2006.01)
*G06F 9/445* (2006.01)

(52) U.S. Cl.
CPC .............. *G06F 8/61* (2013.01); *G06F 9/4401* (2013.01)
USPC ...................................................... 717/168

(58) Field of Classification Search
USPC ...................................................... 717/168
See application file for complete search history.

(56) References Cited

U.S. PATENT DOCUMENTS

| | | | |
|---|---|---|---|
| 6,944,854 B2 * | 9/2005 | Kehne et al. | 717/168 |
| 8,429,639 B2 | 4/2013 | Jirka | |
| 2006/0271923 A1 * | 11/2006 | Bantz et al. | 717/168 |
| 2012/0110562 A1 * | 5/2012 | Heinrich et al. | 717/169 |
| 2012/0214474 A1 * | 8/2012 | Zeilingold et al. | 455/419 |
| 2013/0055230 A1 * | 2/2013 | Kim | 717/168 |
| 2014/0059534 A1 * | 2/2014 | Daum et al. | 717/172 |
| 2014/0068594 A1 * | 3/2014 | Young et al. | 717/172 |

* cited by examiner

*Primary Examiner* — John Chavis
(74) *Attorney, Agent, or Firm* — McDermott Will & Emery LLP (57) ABSTRACT

Systems and methods for updating operating system software are provided. In some aspects, an update for an operating system of a computing device is received, at a first time, at the computing device. A pre-reboot state of the computing device is stored at a second time. The pre-reboot state includes login information for logging into the computing device as a specified user of the computing device, the specified user of the computing device being logged into the computing device at the second time. The computing device is rebooted. Prior to or during rebooting of the computing device, the operating system of the computing device is updated according to the received update. After rebooting the computing device, user access is provided to the updated operating system according to the stored pre-reboot state of the computing device.

13 Claims, 4 Drawing Sheets

UPDATING AN OPERATING SYSTEM

BACKGROUND

The subject technology is generally directed to updating an operating system of a computing device.

A manufacturer of an operating system may provide an update to the operating system that is delivered, via a network, to computers implementing the operating system. In some cases, a user may need to restart the computer or the computer may be restarted automatically for the update to be installed.

SUMMARY

In some aspects, the disclosed subject matter relates to a computer-implemented method for updating an operating system. The method includes receiving, at a first time, an update for an operating system of a computing device at the computing device. The method includes storing, at a second time, a pre-reboot state of the computing device, the pre-reboot state including login information for logging into the computing device as a specified user of the computing device, the specified user of the computing device being logged into the computing device at the second time. The method includes rebooting the computing device, where, prior to or during rebooting of the computing device, the operating system of the computing device is updated according to the received update. The method includes providing user access to the updated operating system according to the stored pre-reboot state of the computing device after rebooting the computing device.

In some aspects, the disclosed subject matter relates to a non-transitory computer-readable medium encoded with executable instructions. The instructions include code for receiving an update for an operating system of the computer. The instructions include code for storing a pre-reboot state of the computer, the pre-reboot state including login information for logging into the computer as a specified user of the computer. The instructions include code for rebooting the computer, where, prior to or during rebooting of the computer, the operating system of the computer is updated according to the received update. The instructions include code for providing user access to the updated operating system according to the stored pre-reboot state of the computer after rebooting the computer.

In some aspects, the disclosed subject matter relates to a computing device. The computing device includes one or more processors and a memory. The memory includes instructions. The instructions include code for receiving, while a first copy of an operating system is running on the computing device, an update for an operating system of a computing device at the computing device. The instructions include code for storing a pre-reboot state of the computing device, the pre-reboot state including login information for logging into the computing device as a specified user of the computing device. The instructions include code for rebooting the computing device. Prior to or during rebooting of the computing device, a second copy of the operating system of the computing device is updated according to the received update. After rebooting of the computing device, the second copy of the operating system of the computing device is running on the computing device. The instructions include code for providing user access to the updated second copy of the operating system according to the stored pre-reboot state of the computing device after rebooting the computing device. The instructions include code for updating the first copy of the operating system of the computing device according to the received update.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

As set forth above, a manufacturer of an operating system may provide an update to the operating system that is delivered, via a network, to computers implementing the operating system. In some cases, a user may need to restart the computer or the computer may be restarted automatically for the update to be installed. The restart of the computer may not be a user-friendly experience as the user may need to close windows in which the user is working or save data created by the user. The user may spend time remembering which windows were open before the restart and reopening the windows. Also, the user may need to re-enter his/her login information (e.g., a password or a username and password combination) for accessing the computer during the restart of the computer. As the foregoing illustrates, a new approach for updating the operating system may be desirable.

The subject technology provides techniques for updating an operating system of a computing device. The computing device receives, at a first time, an update for the operating system of the computing device via a network. The computing device stores, at a second time, a pre-reboot state of the computing device. The second time may occur simultaneously with the first time or immediately (e.g., without any intentional delay, for example, 0.1 seconds, 0.5 seconds, 1 second, or 2 seconds, depending on a processing speed of the computing device) after the first time. Alternatively, the second time may occur an intentional delay or a predetermined duration of time (e.g., 1 second, 1 minute, 1 hour, etc.) after the first time. For example, the second time may occur when the computing device is in sleep mode and the first time may occur when the computing device is in awake mode. The pre-reboot state includes login information (e.g., a password) for logging into the computing device as a specified user of the computing device, the specified user of the computing device being logged into the computing device at the second time. The pre-reboot state may also identify a set of windows open at the computing device, a set of tabs open within the set of windows, information within the set of windows, and a current active window within the set of windows. For example, the pre-reboot state may identify data representing that a document processor application, a web browser, and an audio player application are open on the computing device. The document processor application is active and is displaying page 3 of the document "Letter-to-Sam." The web browser is displaying tabs of the webpages example.com/abc and example.com/def. The audio player application is paused at position 1:02 of the audio file "physics-101-lecture." The pre-reboot state may be stored in an encrypted location to prevent unauthorized access to information in the pre-reboot state, including the login information.

After storing the pre-reboot state, the computing device reboots itself. Prior to or during the rebooting, the operating system of the computing device, or at least one copy of the operating system of the computing device, is updated according to the received update. After the rebooting, the computing device provides user access to the updated operating system according to the stored pre-reboot state of the computing device. The computing device may log into the computing device according to the login information in the pre-reboot state without requiring a user to re-enter the login information. The computing device may re-instantiate, within the updated operating system, the set of windows, the set of tabs, the information within the set of windows, and the current active window of the pre-reboot state.

Advantageously, as a result of some implementations described herein, after rebooting of the computing device, the computing device returns to a state of the computing device prior to the rebooting. As a result, the user's work is not lost and the user may, in some cases, forego saving files and remembering which windows and tabs were open prior to the reboot. Also, user time and effort during rebooting of the computing device is saved by not requiring the user to re-enter his/her login information during the rebooting and operating system updating process.

Figure 1A:
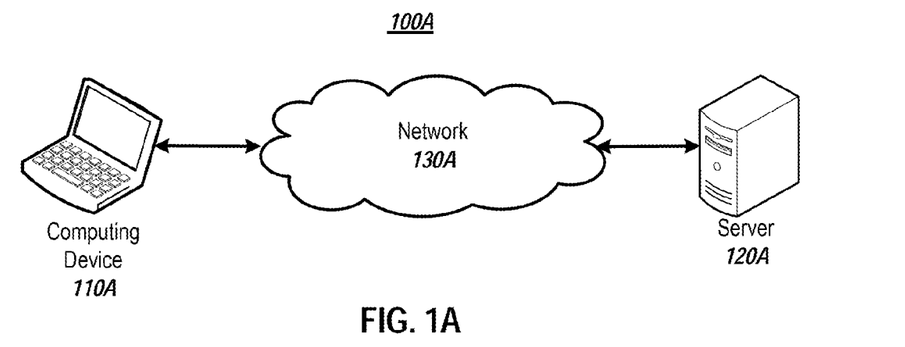
FIG. 1A illustrates an example network system for updating an operating system of a computing device.

FIG. 1A illustrates an example network system 100A for updating an operating system of a computing device. As shown, the network system includes a computing device 110A and a server 120A connected to a network 130A. The computing device 110A and the server 120A may communicate with one another via the network 130A. The network 130A may include any network(s), for example, the Internet, an intranet, a cellular network, a local area network, a wide area network, a wired network, a wireless network, a virtual private network (VPN), etc. The computing device 110A may be any computing device, for example, a laptop computer, a desktop computer, a tablet computer, a mobile phone, a personal digital assistant (PDA), an electronic music player, a smart watch, a television coupled with one or more processors and a memory, etc. The computing device 110A may include an operating system that may be updated using the techniques described herein. The server 120A may be a server of a developer of the operating system of the computing device 110A and may transmit, via the network 130A, updates for the operating system(s) of computer(s) (e.g., computing device 110A) implementing the operating system.

Figure 1B:
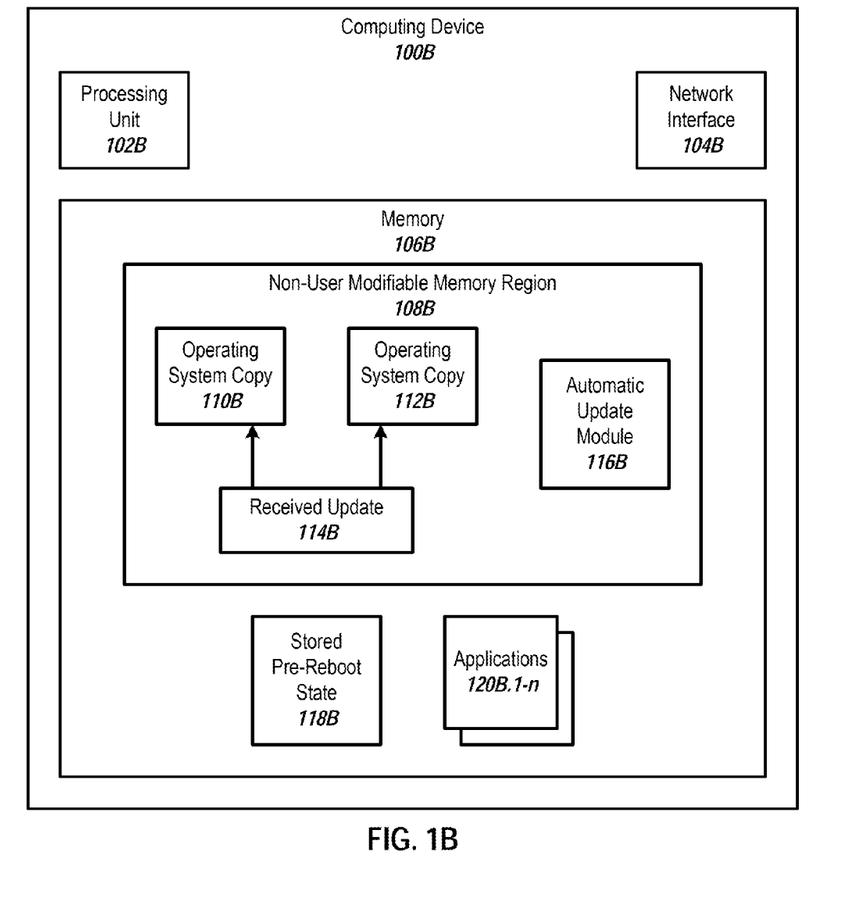
FIG. 1B illustrates an example computing device that may update an operating system.

FIG. 1B illustrates an example computing device 100B configured to update an operating system. The computing device 100B may correspond to the computing device 110A of FIG. 1A and may be a laptop computer, a desktop computer, a tablet computer, a mobile phone, a personal digital assistant (PDA), an electronic music player, a smart watch, a television coupled with one or more processors and a memory, etc.

As shown, the computing device 100B includes a processing unit 102B, a network interface 104B, and a memory 106B. The processing unit 102B includes one or more processors. The processing unit 102B may include a central processing unit (CPU), a graphics processing unit (GPU), or any other processing unit. The processing unit 102B executes computer instructions that are stored in a computer-readable medium, for example, the memory 106B. The network interface 104B allows the computing device 100B to transmit and receive data in a network, for example, the network 130A of FIG. 1A. The memory 106B stores data and/or instructions. The memory 106B may be one or more of a cache unit, a storage unit, an internal memory unit, or an external memory unit. As illustrated, the memory 106B includes a non-user modifiable memory region 108B, which stores operating system copies 110B and 112B, a received update 114B, and an automatic update module 116B. The memory 106B also stores a stored pre-reboot state 118B and applications 120B.1-n.

The non-user modifiable memory region stores 108B data or instructions, including the operating system copies 110B and 112B, the received update 114B, and the automatic update module 116B, which are not modifiable by a user of the computing device 100B. The data or instructions in the non-user modifiable memory region stores 108B may be modifiable, for example, via an update (e.g., received update 114B) received over a network using the network interface 104B.

The operating system copies 110B and 112B are copies of the operating system being implemented by the computing device 100B. At any time when the operating system is running on the computing device 100B, one copy of the operating system is active and running, and another copy is inactive and not running. While the computing device 100B is illustrated as storing two copies of the operating system 110B and 112B, the computing device 100B may store a single copy of the operating system (that is always running when the computing device 100B is running) or more than two copies of the operating system. The computing device may execute application(s), for example, one or more of the applications 120B.1-n within the operating system copy 110B or 112B that is running.

The received update 114B is an update for the operating system of the computing device 100B received, using the network interface 104B, over a network. The received update 114B may be provided by a manufacturer of the operating system, by a manufacturer of the computing device 100B, by an enterprise associated with the computing device 100B, etc. To implement the received update 114B, the operating system copy 110B or 112B running on the computing device 100B may be modified according to the received update 114B.

The automatic update module 116B, when executed, causes the processing unit 102B to receive, via the network interface 104B and at a first time, the update 114B for the operating system. At the first time, the operating system copy 110B is running on the computing device 100B and the operating system copy 112B is not running. Accordingly, the operating system copy 112B is updated at the first time, as the operating system copy 112B may be updated without disturbing the functioning of the operating system copy 110B.

The automatic update module 116B, when executed, causes the processing unit 102B to store, at a second time, a pre-reboot state 118B of the computing device 100B. The stored pre-reboot state 118B includes login information for logging into the computing device as a specified user of the computing device, where the specified user is logged into the computing device at the second time. The stored pre-reboot state 118B may also include indications of the applications **120B.1-*n* that are open on the computing device 100B, tabs open in the applications, data stored within the applications (e.g., data typed into input boxes of a browser application or data being typed in document processor application), and an active application. The second time may occur simultaneously or immediately after the first time. Alternatively, the second time may occur an intentional delay or a predetermined duration of time (e.g., 1 second, 1 minute, 1 hour, etc.) after the first time, for example, when the computing device 100B** is in sleep mode.

The automatic update module 116B, when executed, causes the processing unit 102B to reboot the computing device 100B. During or after rebooting, the processing unit 102B determines that the operating system copy 112B was updated at a later time than the operating system copy 110B. Accordingly, based on the determination that the operating system copy 112B was updated at a later time than the operating system copy 110B, the processing unit 102B updates the operating system copy 110B to match the operating system copy 112B. The processing unit 102B may copy the operating system copy 112B into the operating system copy 110B or the processing unit 102B may apply the received update 114B to the operating system copy 110B. After rebooting, the operating system copy 112B is running and the operating system copy 110B is not running so that the processing unit 102B may write to the operating system copy 110B.

After rebooting the computing device 100B, the processing unit 102B provides user access to the updated operating system copy 112B that is running at the computing device 100B according to the stored pre-reboot state 118B so that the user may continue working at the computing device 100B with no or minimal interruptions to his/her work. For example, the user may be logged into the computing device 100B according to the login information in the stored pre-reboot state 118B without requiring the user to re-enter the login information. In some cases, as a result of the technique described herein, open windows of applications **120B.1-*n***, open tabs within the open windows, and a current active window may be maintained while the update to the operating system is installed.

The applications **120B.1-*n* may include any applications executing on the computing device 100B. For example, the applications 120B.1-*n*** may include one or more of a web browser application, an email application, a document processor application, a spreadsheet application, a slideshow application, a video calling application, etc.

According to some examples, the memory 106B includes a disk and a random access memory (RAM). The stored pre-reboot state 118B may be stored encrypted on the disk, and the stored pre-reboot state 118B be made available after a reboot to the updated operating system copy 112B as long as the RAM remains powered and the encrypted data on disk is not removed. In some examples, the stored pre-reboot state 118B may not be accessible to or modifiable by the user of the computing device to ensure that the information in the stored pre-reboot state 118B is not accessed by an unauthorized person. Furthermore, the computing device 110B may include one or more user accounts of user(s) who are authorized to use the computing device 110B. Each user account may be associated with its own encrypted data, which may not be accessible via other user accounts. When the computing device 100B is rebooted via operation of the automatic updated module 116B, the user may be re-signed into his/her account, which provides access to data in the stored pre-reboot state 118B. The user may be re-signed into his/her account without being required to re-authenticate (e.g., re-enter his/her username or password) and without changing any other security properties of stored encrypted data, including the stored pre-reboot state 118B, on the computing device 100B.

Figure 2:
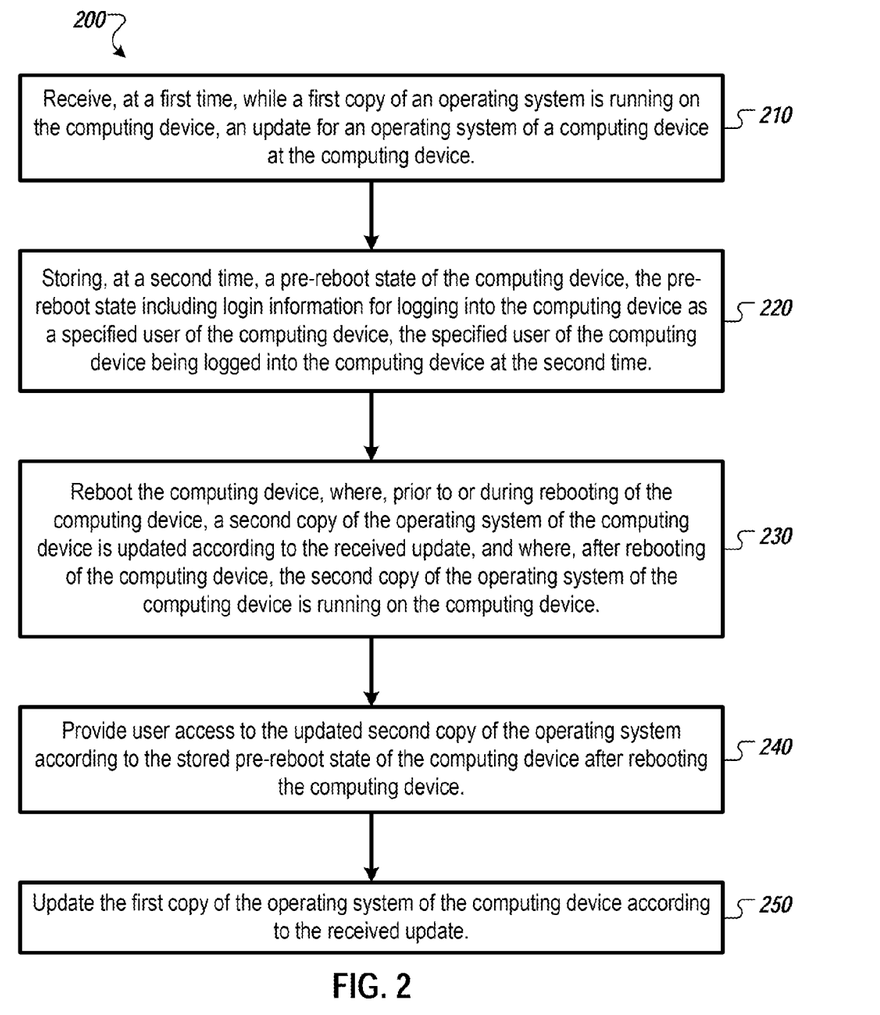
FIG. 2 illustrates an example process by which an operating system of a computing device may be updated.

FIG. 2 illustrates an example process 200 by which an operating system of a computing device may be updated.

The process 200 begins at step 210, where a computing device (e.g., computing device 100B) receives, at a first time, an update (e.g., received update 114B) for an operating system of the computing device. The update for the operating system may be received over a network via a network interface (e.g., network interface 104B). At the first time, a first copy of the operating system (e.g., operating system copy 110B) is running on the computing device and a second copy of the operating system (e.g., operating system copy 112B) is not running on the computing device.

In step 220, the computing device stores, at a second time, a pre-reboot state (e.g., stored pre-reboot state 118B) of the computing device. The pre-reboot state includes login information for logging into the computing device as a specified user of the computing device. The specified user of the computing device is logged into the computing device at the second time. The pre-reboot state may also identify a set of windows open at the computing device, a set of tabs open within the set of windows, information within the set of windows, and a current active window within the set of windows. The second time may coincide with the first time or occur in real-time, without any intentional delay, after the first time. Alternatively, there may be an intentional delay or a predetermined duration of time (e.g., 1 second, 1 minute, 1 hour, etc.) between the first time and the second time. For example, the first time may occur when the computing device is connected to the network and an operating system update is transmitted, over the network, to the computing device. The second time may occur when the computing device is in a sleep mode or is idle.

In step 230, the computing device reboots itself. Prior to or during rebooting of the computing device, the second copy of the operating system is updated according to the received update. For example, the received update may be applied to the second copy of the operating system. After rebooting of the computing device, the second copy of the operating system of the computing device is running on the computing device and the first copy of the operating system is not running on the computing device.

In step 240, the computing device provides user access to the updated second copy of the operating system according to the stored pre-reboot state of the computing device after rebooting the computing device. As a result, after the computing device is rebooted, the user may continue working at the computing device from the stored pre-reboot state and the user's work at the computing device may not be interrupted or may be minimally interrupted. For example, the computing device may log into the computing device according to the login information in the pre-reboot state without requiring a user to re-enter the login information. The computing device may also re-instantiate the windows and tabs stored in the pre-reboot state to allow the user to continue working in the re-instantiated windows and tabs.

In step 250, the computing device updates the first copy of the operating system of the computing device according to the receive update. For example, the received update may be applied to the first copy of the operating system. Alternatively, the second copy of the operating system, which has already been updated prior to or during rebooting, may be copied into the first copy of the operating system. After step 250, the process 200 ends.

Figure 3:
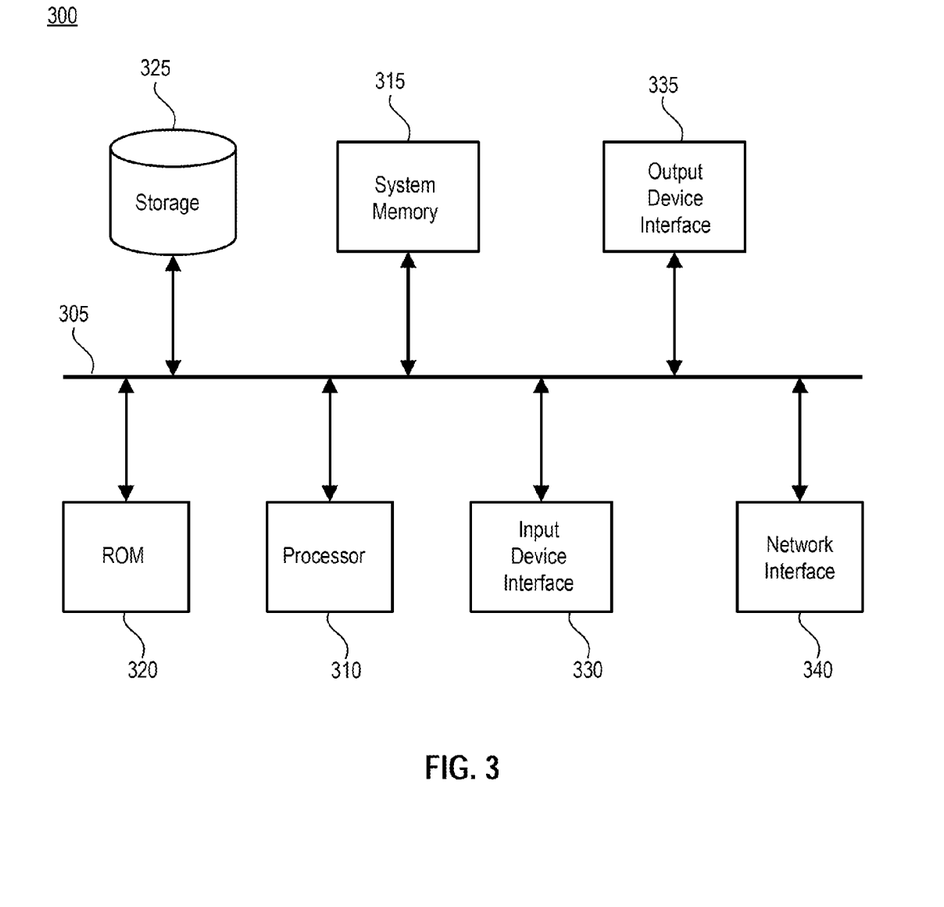
FIG. 3 conceptually illustrates an example electronic system with which some implementations of the subject technology are implemented.

FIG. 3 conceptually illustrates an electronic system 300 with which some implementations of the subject technology are implemented. For example, the computing device 100B may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the subject technology. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for updating operating system software in accordance with some implementations. From these various memory units, the processing unit(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touch screen that functions as both input and output devices.

Finally, as shown in FIG. 3, bus 305 also couples electronic system 300 to a network (not shown) through a network interface 340. In this manner, the electronic system 300 can be a part of a network of computers (for example a local area network (LAN), a wide area network (WAN), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method for updating an operating system, the method comprising:

receiving, at a first time, an update for an operating system of a computing device at the computing device, wherein the computing device comprises at least a first copy of the operating system and a second copy of the operating system, and wherein the first copy of the operating system is running on one or more processors at the first time, and the second copy of the operating system is not running on the one or more processors at the first time, and the first and second copies are distinct from the update;

updating, by the one or more processors running the first copy of the operating system, the second copy of the operating system according to the received update;

storing, at a second time, a pre-reboot state of the computing device, the pre-reboot state comprising login information for logging into the operating system as a specified user of the operating system, the specified user of the operating system being logged into the operating system with the login information at the second time;

rebooting the computing device, wherein, after rebooting the computing device, the second copy of the operating system is running on the one or more processors and the first copy of the operating system is not running on the one or more processors;

providing user access to the updated operating system according to the stored pre-reboot state of the computing device after rebooting the computing device; and updating, by the one or more processors running the second copy of the operating system and after rebooting the computing device, the first copy of the operating system according to the received update.

2. The method of claim 1, wherein the user having entered the login information prior to the second time to log into the operating system, and providing the user access to the updated operating system according to the stored pre-reboot state of the computing device comprises:

logging into the operating system according to the login information in the pre-reboot state without requiring a user to re-enter the login information.

3. The method of claim 1, wherein the second time occurs simultaneously with the first time or within a preset time period after the first time.

4. The method of claim 1, wherein the second time occurs when the computing device is in sleep mode, and wherein the second time follows the first time by a predetermined duration of time.

5. The method of claim 1, wherein the pre-reboot state is stored encrypted on a disk of the computing device, and wherein a random access memory (RAM) of the computing device remains powered during rebooting of the computing device.

6. The method of claim 1, wherein the pre-reboot state identifies a set of windows open at the computing device, a set of tabs open within the set of windows, information within the set of windows, and a current active window within the set of windows, and wherein providing the user access to the updated operating system according to the stored pre-reboot state of the computing device comprises:

re-instantiating, within the updated operating system, the set of windows, the set of tabs, the information within the set of windows, and the current active window of the pre-reboot state.

7. A non-transitory computer-readable medium for updating an operating system, the non-transitory computer-readable medium comprising instructions which, when executed by a computer, cause the computer to implement a method comprising:

receiving, at a first time, an update for an operating system of the computer, wherein the computer comprises at least a first copy of the operating system and a second copy of the operating system, and wherein the first copy of the operating system is running at the first time and the second copy of the operating system is not running at the first time, and wherein the first and second copies of the operating system are distinct from the update;

updating the second copy of the operating system according to the received update;

storing, at a second time, a pre-reboot state of the computer, the pre-reboot state comprising login information for logging into the computer as a specified user of the computer;

rebooting the computer, wherein, after rebooting the computer, the second copy of the operating system is running and the first copy of the operating system is not running;

providing user access to the updated operating system according to the stored pre-reboot state of the computer after rebooting the computer; and updating, after rebooting the computer, the first copy of the operating system according to the received update.

8. The non-transitory computer-readable medium of claim 7, wherein providing the user access to the updated operating system according to the stored pre-reboot state of the computer comprises:

logging into the computer according to the login information in the pre-reboot state without requiring a user to re-enter the login information.

9. The non-transitory computer-readable medium of claim 7, wherein the specified user of the computer is logged into the computer at a time when the pre-reboot state is stored.

10. The non-transitory computer-readable medium of claim 7, wherein the second time occurs simultaneously with the first time or within a preset time period after the first time.

11. The non-transitory computer-readable medium of claim 7, wherein the second time occurs when the computer is in sleep mode, and wherein the second time follows the first time by a predetermined duration of time.

12. A computing device programmed for updating an operating system, the computing device comprising:

one or more processors; and a memory comprising instructions which, when executed by the one or more processors, cause the one or more processors to implement a method, the method comprising:

receiving, while a first copy of an operating system is running on the one or more processors of the computing device, an update for the operating system of the computing device at the computing device;

storing a pre-reboot state of the computing device, the pre-reboot state comprising login information for logging into the computing device as a specified user of the computing device;

rebooting the computing device, wherein, prior to or during rebooting of the computing device, a second copy of the operating system of the computing device is updated by the one or more processors according to the received update, and wherein, after rebooting of the computing device, the second copy of the operating system of the computing device is running on the one or more processors of the computing device;

providing user access to the updated second copy of the operating system running on the one or more processors according to the stored pre-reboot state of the computing device after rebooting the computing device; and updating, after rebooting the computing device and by the one or more processors, the first copy of the operating system of the computing device according to the received update, while the second copy of the operating system is running on the one or more processors.

13. The computing device of claim 12, the memory further comprising a non-user modifiable memory region storing the first copy of the operating system and the second copy of the operating system.

* * * * *